(12) United States Patent
Conzola et al.

(10) Patent No.: US 6,924,743 B2
(45) Date of Patent: Aug. 2, 2005

(54) METHOD AND SYSTEM FOR ALERTING CUSTOMERS IN A SHOPPING AREA

(75) Inventors: Vincent Charles Conzola, Raleigh, NC (US); Jeff David Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 10/647,721

(22) Filed: Aug. 25, 2003

(65) Prior Publication Data

US 2005/0046570 A1 Mar. 3, 2005

(51) Int. Cl.[7] .................. G08B 13/14; G08B 21/00; G08B 23/00; G06F 17/60; G07G 1/00; G06K 7/00

(52) U.S. Cl. .................. 340/573.1; 340/568.1; 340/568.5; 340/568.6; 340/686.6; 705/16; 705/17; 705/18; 705/19; 705/20; 705/21; 705/28; 235/2; 235/4; 235/7 R; 235/23; 235/435

(58) Field of Search .................. 340/568.1, 568.5, 340/686.5, 686.6, 573.1; 705/16–28; 235/2–23, 435

(56) References Cited

U.S. PATENT DOCUMENTS

| | | |
|---|---|---|
| 3,051,936 A | 8/1962 | Finger et al. |
| 3,457,423 A | 7/1969 | Gravely |
| 4,327,819 A | 5/1982 | Coutta |
| 4,723,118 A | 2/1988 | Hooley et al. |
| 5,500,526 A | 3/1996 | Shalvi et al. |
| 5,610,584 A | 3/1997 | Schrade |
| 5,910,769 A | 6/1999 | Geisler |
| 6,169,483 B1 | 1/2001 | Ghaffari et al. |
| 6,201,473 B1 | 3/2001 | Schaffer |

FOREIGN PATENT DOCUMENTS

| | | |
|---|---|---|
| JP | 9083682 | 3/1997 |

*Primary Examiner*—Jeffery Hofsass
*Assistant Examiner*—Lam Pham
(74) *Attorney, Agent, or Firm*—Sawyer Law Group LLP; Jeanine Ray-Yarletts

(57) ABSTRACT

An alert notification system for customers and sales personnel in a shopping area and a method of use is disclosed. In a first aspect, a system for alerting customers and sales personnel that merchandise has been left in a shopping area is disclosed. The system comprises a merchandise detector for detecting merchandise purchased by a customer and a customer detector for detecting whether the customer has left the merchandise. The system further includes a notification system responsive to the customer and merchandise detectors for alerting the customer when the customer has left the purchased merchandise. In a second aspect, the method comprises detecting the presence of merchandise associated with a customer via a second detector and detecting whether the customer has left the merchandise via a second detector. The method further includes alerting the customer, responsive to the first and second detectors, via a notification mechanism if the customer has left the merchandise. Accordingly, a system and method in accordance with the present invention provides for an alert notification system for customers in a shopping area. By detecting individual customers and the merchandise associated with each, a customer and/or sales personnel can be alerted if he or she forgets the merchandise. In so doing the likelihood that a customer will leave the merchandise in the shopping area is substantially reduced.

18 Claims, 3 Drawing Sheets

METHOD AND SYSTEM FOR ALERTING CUSTOMERS IN A SHOPPING AREA

FIELD OF THE INVENTION

The present invention relates generally to the retail industry and more particularly to a system and method for alerting customers when merchandise purchased by the customer is forgotten.

BACKGROUND OF THE INVENTION

After completing a purchase transaction, customers may leave behind merchandise which they have purchased. Customers can be distracted while entering credit card information, for example, having conversations with cashiers, or while looking for cash in their wallets. Additionally, retailers are implementing various kinds of merchandise bagging equipment, including bag carousels.

For example, many retailers utilize bag carousel equipment at the end of their checkout counters. In this type of arrangement, after items are scanned, they are placed directly into bags located on a rotating carousel. As the cashier fills each bag, the carousel is rotated to the next empty bag position. The filled bags are rotated toward the customer who is instructed to remove the filled bags from the carousel. A major problem with this type of system is that customers are often occupied with other tasks during the checkout process and neglect to remove the filled bags from the carousel. Filled bags may then be rotated out of view of both the cashier and the customer and then be left behind when the customer exits the store.

As a result of these situations, customers may forget to take their purchased and paid-for merchandise with them. Accordingly, what is needed is a system and method for alerting store personnel and the customer when a customer is leaving the checkout counter and has left behind the merchandise. The present invention addresses such a need.

SUMMARY OF THE INVENTION

An alert notification system for customers and sales personnel in a shopping area and a method of use is disclosed. In a first aspect, a system for alerting customers and sales personnel that merchandise has been left in a shopping area is disclosed. The system comprises a merchandise detector for detecting merchandise purchased by a customer and a customer detector for detecting whether the customer has left the merchandise. The system further includes a notification system responsive to the customer and merchandise detectors for alerting the customer when the customer has left the purchased merchandise.

In a second aspect, the method comprises detecting the presence of merchandise associated with a customer via a second detector and detecting whether the customer has left the merchandise via a second detector. The method further includes alerting the customer, responsive to the first and second detectors, via a notification mechanism if the customer has left the merchandise.

Accordingly, a system and method in accordance with the present invention provides for an alert notification system for customers in a shopping area. By detecting individual customers and the merchandise associated with each, a customer and/or sales personnel can be alerted if he or she forgets the merchandise. In so doing the likelihood that a customer will leave the merchandise in the shopping area is substantially reduced.

DETAILED DESCRIPTION

The present invention relates generally to the retail industry and more particularly to a system and method for alerting customers when merchandise purchased by the customer is forgotten.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
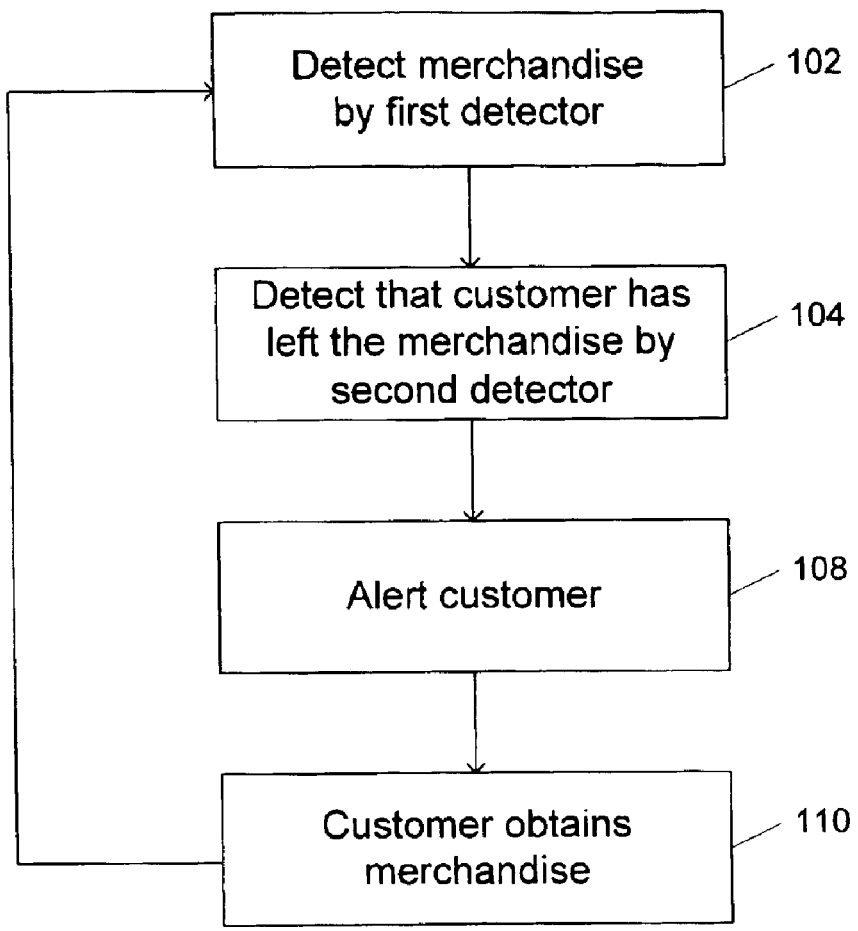
FIG. 1 is a simplified flow chart of the alert notification system in accordance with the present invention.

A system and method in accordance with the present invention comprises an alert notification system for customers and sales personnel. FIG. 1 is a simplified flow chart of the alert notification system in accordance with the present invention. First, the merchandise is detected via a first detector, via step 102. Next, it is detected that the customer associated with the merchandise has left the merchandise, via step 104. Then the customer is alerted, via step 108. Following the alert, the customer obtains the merchandise which has been left behind, via step 110.

Figure 2:
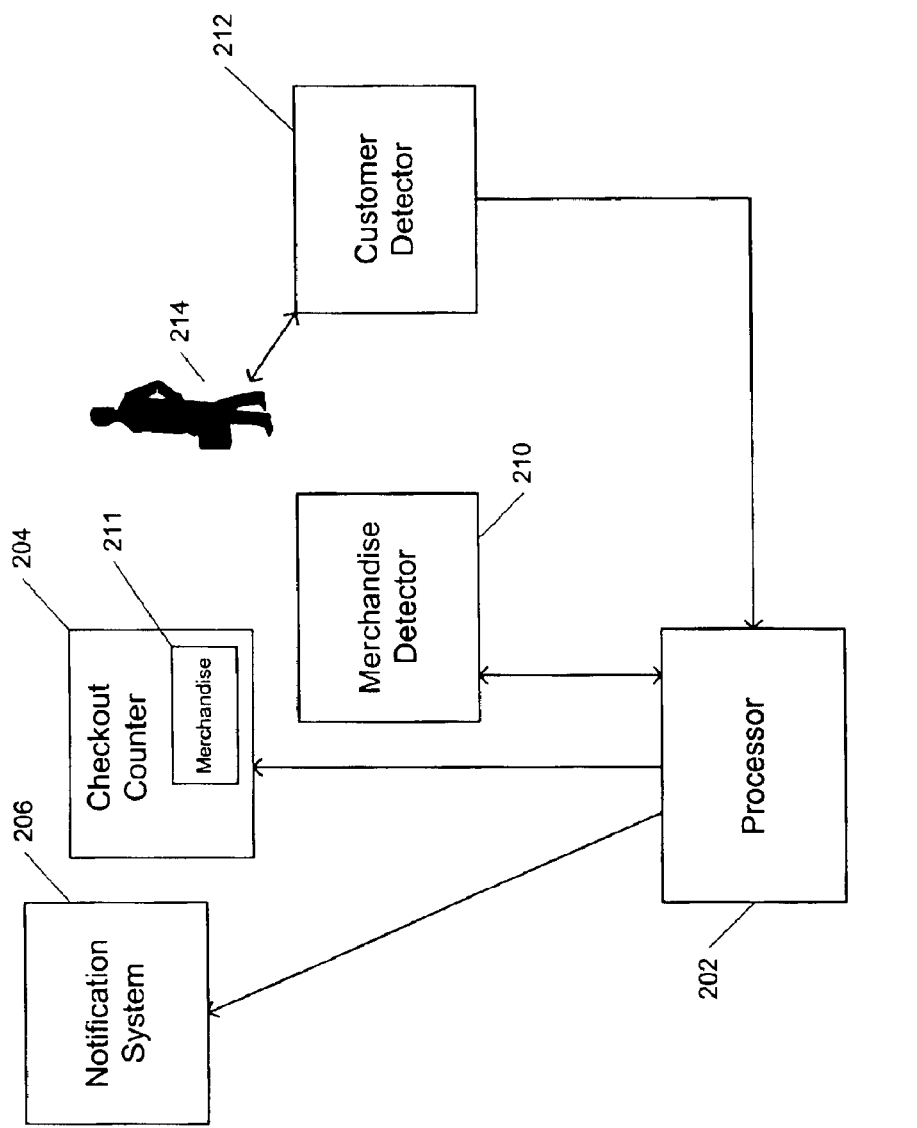
FIG. 2 illustrates the system in accordance with the present invention.

For a more detailed description of the features of the present invention, refer now to the following description in conjunction with the accompanying figures. FIG. 2 illustrates the system 200 in accordance with the present invention. The system 200 comprises a point of sale (POS) processor 202 which is coupled to a merchandise detector 210, customer detector 212 and a notification system 206. The system 200 further includes a checkout counter 204. Merchandise 211 associated with the customer 214 is located on the checkout counter 204.

Figure 3:
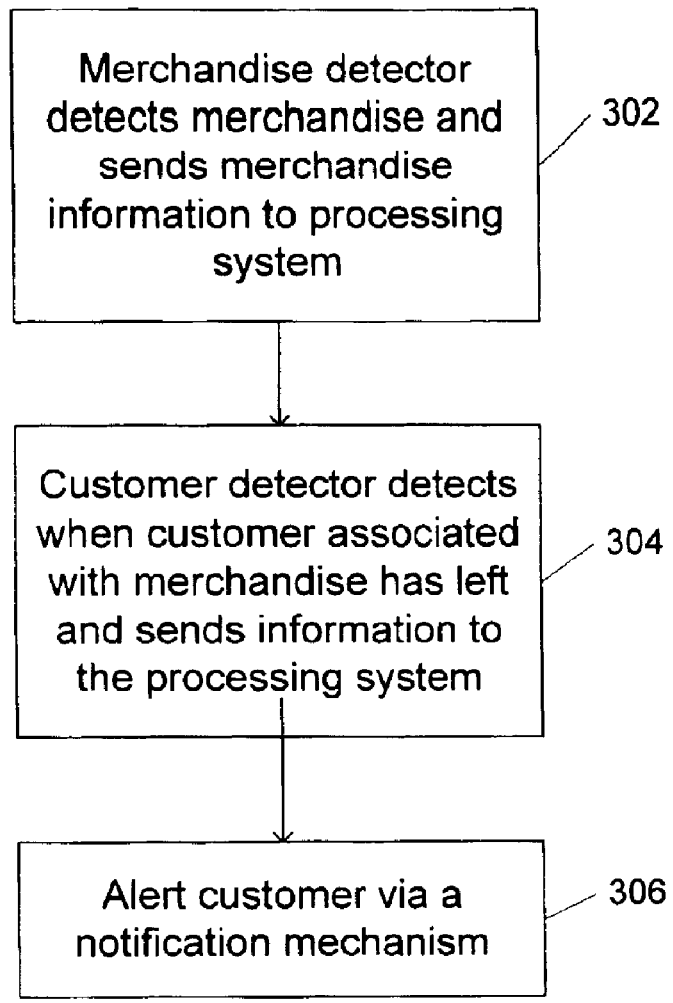
FIG. 3 is a flow chart of the operation of the system in accordance with the present invention when utilized for alert notification.

FIG. 3 is a flow chart of the operation of system 200 when utilized for alert notification. Referring to FIGS. 2 and 3 together, the merchandise detector 210 detects the presence of merchandise 211 and sends merchandise information to the processing system 202, via step 302. The merchandise detector 210 could, for example, comprise a weight sensor beneath the checkout counter 204, an electromechanical switch on the checkout counter 204, or a video camera mounted above the checkout counter 204. Once the presence of merchandise 211 is detected, this information is then displayed to a cashier and customer 211. The display can be visual (such as a light on the bag carousel or a message on the POS processor 202) or auditory (a tone or voice message). The timing of the display can be continuous—that is, the presence is indicated as long as there is a filled bag on the checkout counter 204, or it can be activated at the end of the checkout transaction by interfacing with the POS processor 202. As an alternative, there is no display/alert until the customer is leaving merchandise. It has been found that in some circumstances the customer and/or sales personnel will not pay attention to an alert that is on continually.

The customer detector 212 then detects whether the customer 214 associated with the merchandise 211 has left and sends information regarding the customer 214 leaving to the processing system 202, via step 304. In a system and method in accordance with the present invention, the presence of the customer 214 in front of the checkout counter 204 can be detected or the customer 214 leaving the area can be detected.

In a first embodiment, an "electric eye" at the end of the checkout counter 204 could be utilized to detect the customer 211 leaving without the merchandise. If the customer 214 exits at the end of the checkout lane without taking their merchandise, the customer 214 would be notified to check for all purchases. In a second embodiment, a video camera detects when the customer leaves the area.

In a third embodiment a pressure sensitive mat could be utilized to detect the customer 214 leaving without the merchandise 211.

In a normal position, that is, when the customer is purchasing the merchandise, the customer 213 would stand on the mat and a presence sensor would be activated. If the customer 214 either leaves the "normal" position and steps off of the mat, the customer 214 would be notified to check for all purchases. Finally, in a fourth embodiment, an infrared presence detector can be used to detect the presence of a customer in front of the checkout station.

After the customer detector 212 indicates that the customer 214 has left the area, and at the same time the merchandise detector 210 still detects the merchandise 211, then the customer 214 is alerted via a notification system 206, via step 306. The notification system 206 could comprise, for example, a flashing light, a device which creates an audible sound, information displayed for the cashier via a message on the cashiering apparatus, or any other kind of alert notification system.

The notification system could activate a device which produces a light or audible sound or if the customer's name is known as a result of data captured during the transaction the customer can be notified by name or other personal data. One of ordinary skill in the art readily recognizes that although specific notification mechanisms have been disclosed, a variety of such mechanisms could be used and they would be within the spirit and scope of the present invention.

Accordingly, a system and method in accordance with the present invention provides for an alert notification system for customers in a shopping area. By detecting individual customers and the merchandise associated with each, a customer can be alerted if he or she forgets the merchandise. In so doing the likelihood that a customer will leave the merchandise in the shopping area is substantially reduced.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for alerting customers and sales personnel that merchandise has been left in a shopping area, the system comprising:

a merchandise detector for detecting merchandise purchased by a customer;

a customer detector for detecting whether the customer has left the merchandise; and a notification system responsive to the customer and merchandise detectors for alerting the customer when the customer has left the purchased merchandise.

2. The system of claim 1 which includes a processing system for receiving information from the customer and merchandise detectors and providing appropriate signals to the notification system.

3. The system of claim 1 wherein the customer detector is a pressure-sensitive mat.

4. The system of claim 1 wherein the customer detector is a video camera.

5. The system of claim 1 wherein the notification system comprises a flashing light which is activated when the customer has forgotten the merchandise.

6. The system of claim 1 wherein the notification system comprises producing an audible sound when the customer has forgotten the merchandise.

7. The system of claim 1 wherein a notification system comprises a display message.

8. The system of claim 1 wherein the merchandise detector comprises a weight sensor beneath the merchandise.

9. The system of claim 1 wherein the merchandise detector comprises an electromechanical switch located on a checkout counter.

10. A method for alerting customers and sales personnel that merchandise has been left in a shopping area, the method comprising the steps of:

(a) detecting a presence of purchased merchandise associated with a customer via a first detector;

(b) detecting whether the customer has left the merchandise via a second detector; and (c) alerting the customer, responsive to the first and second detectors, via a notification mechanism if the customer has left the merchandise.

11. The method of claim 10 wherein the first detector is a pressure-sensitive mat.

12. The method of claim 10 wherein the first detector is a video camera.

13. The method of claim 10 wherein the notification mechanism comprises a flashing light which is activated when the customer has forgotten the merchandise.

14. The method of claim 10 wherein the notification mechanism comprises producing an audible sound when the customer has forgotten the merchandise.

15. The method of claim 10 wherein a notification mechanism comprises a display message.

16. The method of claim 10 wherein the second detector comprises a weight sensor beneath the merchandise.

17. The method of claim 10 wherein the second detector comprises an electromechanical switch located on a checkout counter.

18. A system for alerting customers and sales personnel that merchandise has been left in a shopping area, the system comprising:

a point of sale processing system;

a merchandise detector coupled to the processing system for detecting merchandise purchased by a customer;

a customer detector coupled to the processing system for detecting whether the customer has left the merchandise;

a checkout stand upon which the merchandise is located; and a notification system coupled to the processing system responsive to the customer and merchandise detectors for alerting the customer when the customer has forgotten the purchased merchandise.

* * * * *